(12) United States Patent
Perriard

(10) Patent No.: US 7,336,069 B2
(45) Date of Patent: Feb. 26, 2008

(54) EDDY CURRENT SENSOR AND SENSOR COIL FOR THE SAME

(75) Inventor: Jacques Perriard, Romont (CH)

(73) Assignee: Vibro-Meter SA (CH)

( * ) Notice: Subject to any disclaimer, the term of this patent is extended or adjusted under 35 U.S.C. 154(b) by 0 days.

(21) Appl. No.: 11/565,894

(22) Filed: Dec. 1, 2006

(65) Prior Publication Data
US 2007/0229065 A1 Oct. 4, 2007

(30) Foreign Application Priority Data
Dec. 2, 2005 (CH) ................................ 05405682

(51) Int. Cl.
*G01B 7/14* (2006.01)
*G01N 27/72* (2006.01)
(52) U.S. Cl. .................. 324/207.16; 324/236
(58) Field of Classification Search ................ 324/222, 324/234, 236, 237, 238, 239, 240, 207.16; 331/65
See application file for complete search history.

(56) References Cited

U.S. PATENT DOCUMENTS 5,539,323 A 7/1996 Davis, Jr.
5,770,941 A * 6/1998 Van Den Berg ....... 324/207.16
6,072,312 A * 6/2000 Van Den Berg ....... 324/207.16
6,246,229 B1 6/2001 Slates

OTHER PUBLICATIONS

International Search Report dated Apr. 12, 2006.

* cited by examiner

*Primary Examiner*—Patrick Assouad
*Assistant Examiner*—David M Schindler
(74) *Attorney, Agent, or Firm*—Ostrolenk, Faber, Gerb & Soffen, LLP

(57) ABSTRACT

The invention pertains to an eddy current sensor with a sensor circuit having a head portion, including a sensor coil, a base portion and a transmission cable connecting the head portion to the base portion. The transmission cable is a triaxial cable and the sensor coil is connected between the inner conductor and the outer shield of this cable. The base portion of the sensor circuit comprises a voltage follower connected to buffer the voltage of the center conductor and apply it to the inner shield of the triaxial cable in order to isolate the cable's line capacitance from the sensor coil. The invention further concerns a sensor coil for an eddy current sensor, having a segmented winding structure with a particularly low self-capacitance. In a preferred embodiment, the triaxial transmission cable is combined with a sensor coil having this segmented winding structure.

13 Claims, 2 Drawing Sheets

EDDY CURRENT SENSOR AND SENSOR COIL FOR THE SAME

CROSS REFERENCE TO RELATED APPLICATIONS

This application claims the benefit of the filing date of European Patent Application No. 05405682.5 filed 2 Dec. 2005, the disclosure of which is hereby incorporated by reference.

BACKGROUND OF THE INVENTION

1. Field of the Invention

The invention relates to an eddy current sensor and a sensor coil for such a sensor.

2. Description to the Related Art

An eddy current sensor comprises means for generating an eddy current in an electrically conducting test object and a sensor coil for the detection of the magnetic field of this eddy current. The sensor coil is part of a sensor circuit which produces an output signal indicating the distance between the sensor coil and the test object.

An already known type of eddy current sensor comprises a sensor head with a head portion of the sensor circuit including the sensor coil, a base unit with a base portion of the sensor circuit and a transmission cable connecting the head portion to the base portion of the circuit. Besides the sensor coil, most of the components of the sensor circuit are arranged in the base unit.

The accuracy of long term measurements with an eddy current sensor is adversely affected by the sensor's output signal drift.

SUMMARY OF THE INVENTION

An object of the invention is to reduce the long term drift of the output signal of an eddy current sensor.

This object is achieved by an eddy current sensor comprising a sensor circuit with means for generating an eddy current in a test object and a sensor coil for sensing this eddy current, the sensor circuit consisting of a head portion including the sensor coil, a base portion and a transmission cable connecting the head portion to the base portion, wherein the transmission cable is a triaxial cable having a center conductor, an inner shield and an outer shield, the sensor coil is connected between the center conductor and the outer shield and the base portion of the sensor circuit comprises a voltage follower connected between the center conductor and the inner shield to isolate the line capacitance of the cable from the sensor coil and a sensor coil for an eddy current sensor wherein it comprises two or more coil segments ($s_1$-$s_n$) having a number of consecutive windings arranged in one or several superimposed winding layers respectively, and that these coil segments ($s_1$-$s_n$) are arranged side by side along a coil axis 17 and connected in series.

BRIEF DESCRIPTION OF THE DRAWINGS

The invention is explained in detail hereinafter with reference to exemplary embodiments represented in the accompanying drawings, in which.

DESCRIPTION OF A PREFERRED EMBODIMENT

Figure 1:
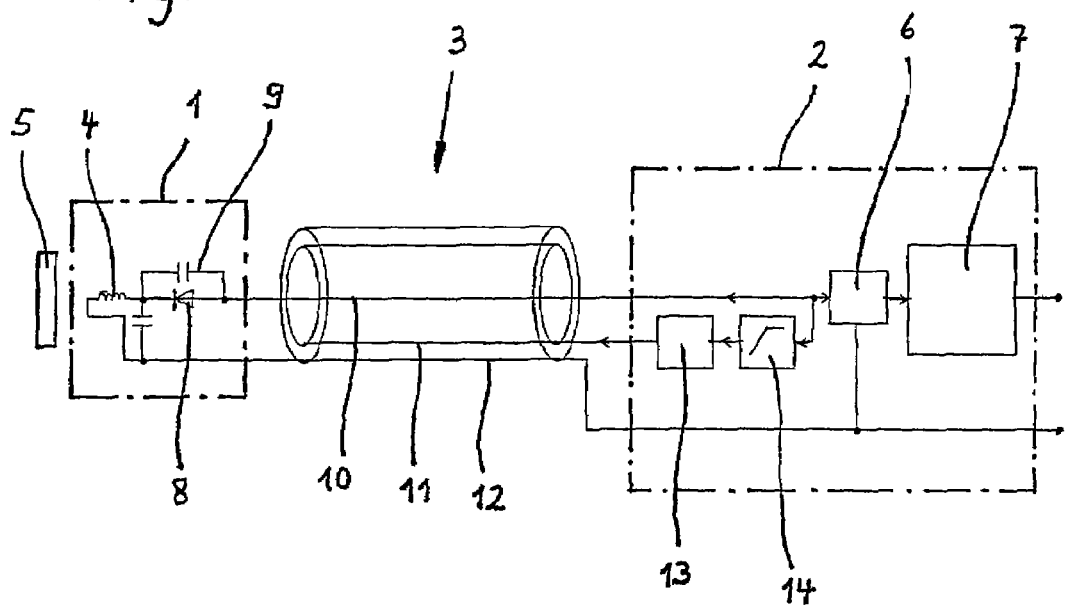
FIG. 1 shows the circuit diagram of a self-oscillating eddy current sensor.

FIG. 1 shows the circuit diagram of an eddy current sensor. The sensor circuit comprises a head portion 1 and a base portion 2, which are interconnected via a transmission cable 3. The head portion 1 may be arranged in a sensor head housing and the base portion may be arranged in a base unit housing, which are not shown.

The head portion 1 comprises a sensor coil 4 which is supplied with an alternating current in order to generate a magnetic field inducing an eddy current in a nearby test object 5. The alternating current is generated by an oscillator 6. In this example, the sensor is self-oscillating: the sensor coil 4 is included in the resonant circuit of the oscillator 6. For instance, a Collpits oscillator 6 may be used.

The oscillation amplitude of oscillator 6 is modulated by the distance between the sensor coil 4 and the test object 5: The closer the test object 5, the greater is the loss of the resonant circuit and the lower is the amplitude of the voltage across the sensor coil 5. The oscillation amplitude is measured and transformed into a sensor output signal by a signal conditioning circuit 7.

The signal conditioning circuit 7 may comprise a rectifier for the demodulation of the measuring signal, a low pass filter suppressing the oscillator frequency component of the demodulated signal, a linearization circuit for the generation of a voltage varying in proportion to the distance between the sensor coil 4 and the test object 5 and an amplifier for sensitivity adjustment and signal offset compensation.

In order to improve the accuracy of long term measurements, the sensor circuit may comprise means for the compensation of the influence of temperature in order to provide an output signal which is not affected by changes in temperature. A diode 8, bridged by a capacitor 9 and connected in series with the sensor coil 4 may be arranged in the head portion 1 of the sensor circuit for the measurement of the sensor head temperature.

However, output signal drift is not merely temperature induced. The oscillator's amplitude is affected by changing parasitic capacitances in the measuring circuit, such as the self-capacitance of the sensor coil 4 or the line capacitance of the transmission cable 3. These are influenced by environmental factors such as air moisture or by the ageing of certain materials or by deformation of the cable due to bending, for instance, which are difficult to compensate. Means for reducing these parasitic capacitances are therefore suggested, in order to reduce their influence on the measuring circuit.

The transmission cable is a triaxial cable, having a center conductor 10, an inner shield 11 and an outer shield 12. The shield 11 is arranged between the center conductor 10 and the outer shield 12. The sensor coil 4 is connected between the center conductor 10 and the outer shield 12 and the base portion 2 of the sensor circuit comprises a voltage follower 13 connected between the center conductor 10 and the inner shield 11. The voltage follower 13 buffers the voltage between the center conductor 10 and the outer shield 12 and applies it to the inner shield 11, so that the center conductor 10 and the inner shield 11 are on the same electric potential and no current flows through the line capacitance between them. The current flowing through the line capacitance between the inner shield 11 and the outer shield 12 is provided by the voltage follower 13. As a result, the voltage follower 13 virtually isolates the cable's line capacitance from the sensor coil 4.

The voltage follower is preceded by a high pass filter 14 to reject the common mode voltage which drops across the diode 8 and serves as a temperature measurement signal.

Figure 2:
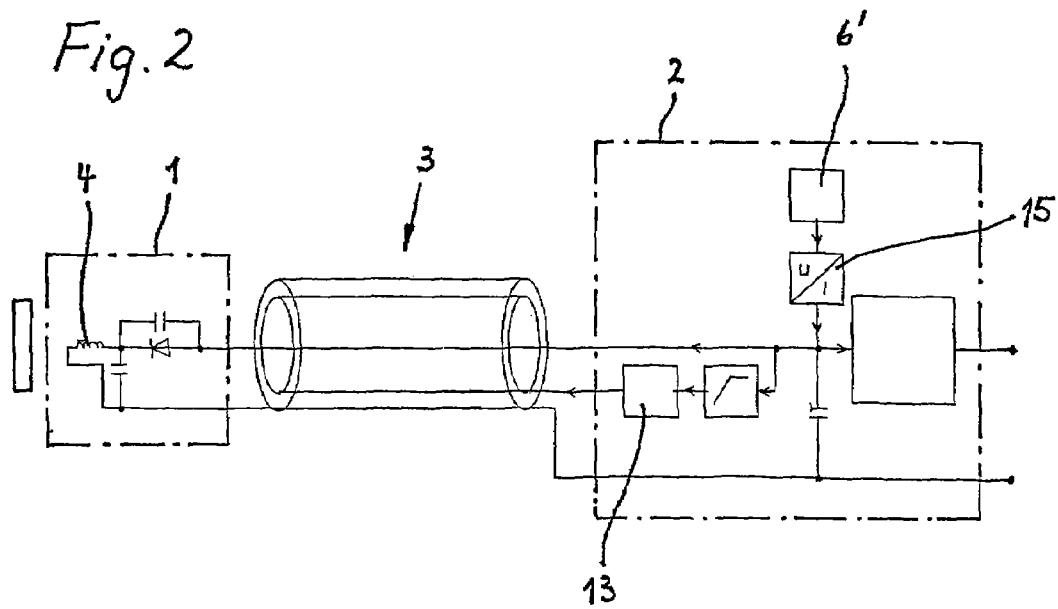
FIG. 2 shows the circuit diagram of an eddy current sensor with a local oscillator.

FIG. 2 shows the circuit diagram of an eddy current sensor which differs from the one shown in FIG. 1 in that its sensor coil 4 is not part of the oscillator's resonant circuit: a local oscillator 6' is provided for the generation of an alternating voltage and a voltage to current converter 15 is connected to supply the sensor coil 4 with a corresponding alternating current. The triaxial cable 3 and the voltage follower 13 are connected and operate in the same way as described with regard to FIG. 1 above.

In eddy current sensors for measurements at high temperatures or with high accuracy, the sensor coil is usually an air coil, because the magnetic properties of ferrite cores vary, from one sample to another and also as a function of temperature. The oscillator of an air coil eddy current sensor operates at a frequency, called carrier frequency, of 700 kHz at least. Even at these high frequencies the isolation of the cable capacitance by means of a voltage follower is possible, if the bandwidth of the voltage follower is sufficiently high. Preferably a voltage follower with a 3 db cut-off frequency of at least 150 MHz is used.

The sensor coil 4 in the examples according to FIG. 1 and FIG. 2 may be a conventional solenoid air coil. However, the measuring accuracy is further improved with the coil design described hereafter with reference to FIG. 3, especially for coils with an outer diameter of more than 6 mm.

Figure 3:
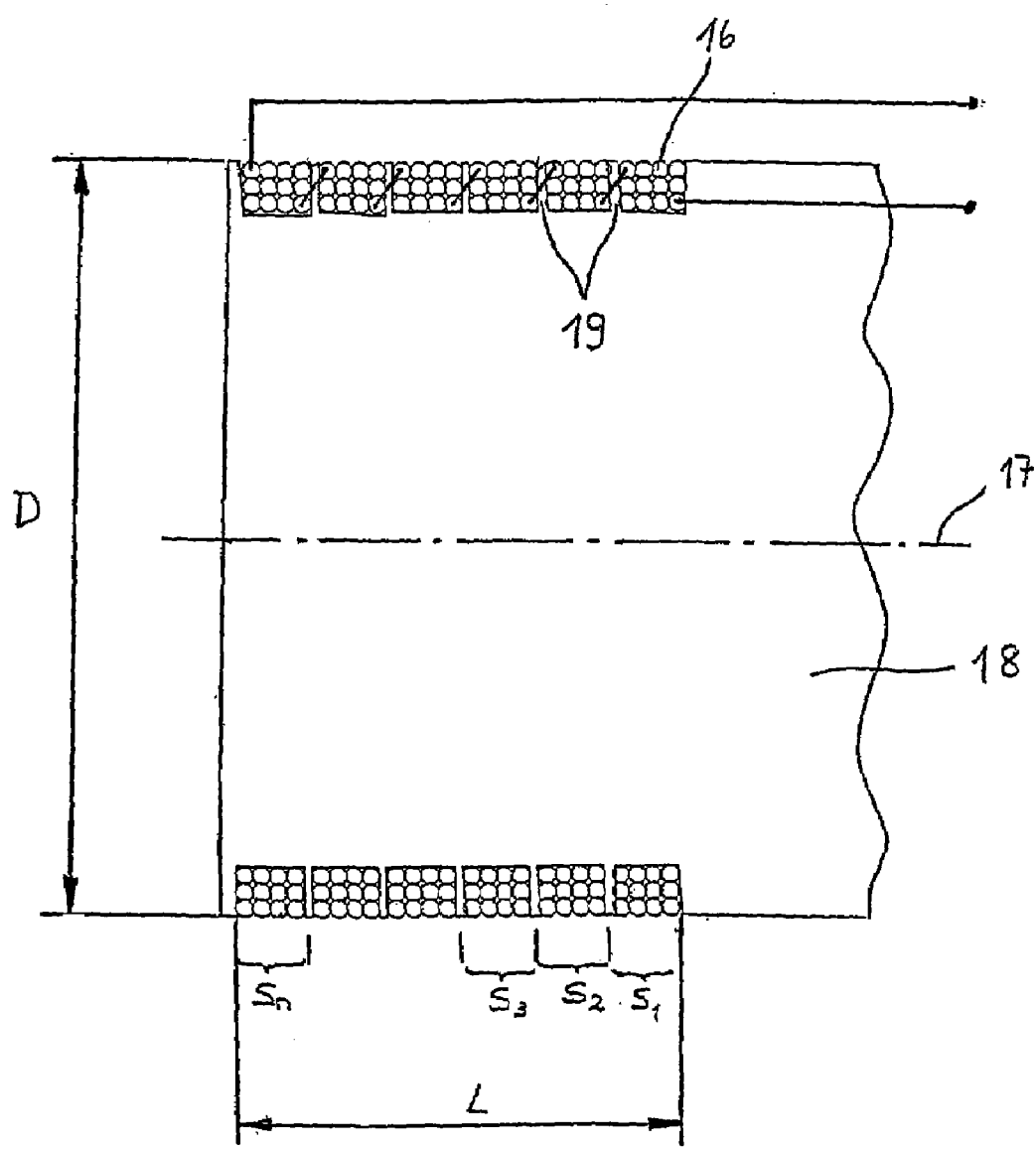
FIG. 3 shows the longitudinal sectional view of a segmented sensor coil for an eddy current sensor.

FIG. 3 shows the longitudinal sectional view of a sensor coil for an eddy current sensor. The total length L of the coil is divided into two or more coil segments $s_1$-$s_n$. Each segment has a number of consecutive windings 16 which are arranged in a single winding layer or in at least two superimposed winding layers. In the example shown in FIG. 3, each segment has three superimposed winding layers. The distance between adjacent windings of neighbouring coil segments, in this example defined by the thickness of the separating walls 19, is greater than the distance between adjacent windings within these coil segments.

The sensor coil consists of the coil segments $s_1$-$s_n$ connected in series and arranged side by side along a sensor coil axis, which coincides with the axes 17 of the coil segments $s_1$-$s_n$.

Since the coil segments $s_1$-$s_n$ are aligned on a common axis 17, they all see the same magnetic flux and the magnetic properties of this sensor coil are therefore similar to those of a conventional solenoid coil having the same length L, diameter D, number of windings and number of winding layers. On the other hand, its self-capacitance is approximately equal to the value of the self-capacitance of one of the coil segments $s_1$-$s_n$ divided by the number n of such segments, which is substantially lower than the self-capacitance of said conventional solenoid coil.

In the preferred embodiment shown in FIG. 3, the coils are consecutively wound about a common bobbin 18, from a single piece of winding wire. When making the coil, all the windings of the first coil segment $s_1$ are wound before a first winding of a second coil segment $s_2$ is wound. Subsequently, all the windings of the second coil segment $s_2$ are wound before winding of the third segment $s_3$ is started, and so forth. Each of the segments is wrong, so that the last winding of one segment can lead to the first winding of the following segment without crossing wires. Preferably all the segments have the same number of windings and layers.

The coil bobbin 18 consists of a non magnetic material such as a synthetic material or ceramics and it doesn't have a ferrite core, the sensor coil being an air coil. The bobbin is provided with a circumferential groove for each of the coil segments $s_1$-$s_n$, which holds the windings of the respective segment. Adjacent grooves are arranged close to one another and merely separated by thin walls 19 with a preferred thickness of 0.5 mm or less.

The segmented sensor coil described herebefore with reference to FIG. 3 was found to be especially useful for sensor coils with an outer diameter D of 6 mm or more. It may be arranged in a sensor head housing along with further components of the head portion of a conventional eddy current sensor circuit. However, the best measuring accuracy is achieved if the segmented sensor coil is combined with the triaxial transmission cable and voltage follower, in an eddy current sensor as described with reference to FIGS. 1 and 2.

The invention claimed is:

1. Eddy current sensor, comprising a sensor circuit with means for generating an eddy current in a test object and a sensor coil for sensing this eddy current, the sensor circuit consisting of a head portion including the sensor coil, a base portion and a transmission cable connecting the head portion to the base portion, wherein the transmission cable is a triaxial cable having a center conductor, an inner shield and an outer shield, the sensor coil is connected between the center conductor and the outer shield and the base portion of the sensor circuit comprises a voltage follower connected between the center conductor and the inner shield to isolate the line capacitance of the cable from the sensor coil.

2. Eddy current sensor according to claim 1, wherein the sensor circuit comprises an oscillator (6, 6') arranged to supply the sensor coil with an alternating current in order to generate the eddy current in the test object.

3. Eddy current sensor according to claim 2, wherein the eddy current has a frequency of at least 700 kHz.

4. Eddy current sensor according to claim 1, wherein the eddy current has a frequency of at least 700 kHz.

5. Eddy current sensor according to claim 4, wherein the voltage follower has a 3 dB cut-off frequency of 150 MHz at least.

6. Sensor coil, for an eddy current sensor, according to claim 1, wherein it comprises two or more coil segments ($s_1$-$s_n$) having a number of consecutive windings arranged in one or several superimposed winding layers respectively, and that these coil segments ($s_1$-$s_n$) are arranged side by side along a coil axis and connected in series.

7. Sensor coil according to claim 6, wherein the coil segments ($s_1$-$s_n$) are wound so that the last winding of one segment leads to the first winding of the following segment without crossing wires.

8. Sensor coil according to claim 7, wherein the coil segments ($s_1$-$s_n$) are wound consecutively from a single piece of winding wire.

9. Sensor coil according to claim 6, wherein the coil segments ($s_1$-$s_n$) are wound consecutively from a single piece of winding wire.

10. Sensor coil according to claim 6, wherein the coil segments are wound about a common bobbin.

11. Sensor coil according to claim 6, wherein the outer diameter D of the coil segments is larger than the coil length L.

12. Sensor coil according to claim 6, wherein the windings of each segment are arranged in at least two superimposed winding layers.

13. Sensor coil according to claim 6, wherein a distance between adjacent windings of neighboring coil segments is greater than a distance between adjacent windings within these coil segments.

* * * * *

UNITED STATES PATENT AND TRADEMARK OFFICE
CERTIFICATE OF CORRECTION

PATENT NO.        : 7,336,069 B2                                              Page 1 of 1
APPLICATION NO. : 11/565894
DATED             : February 26, 2008
INVENTOR(S)       : Jacques Perriard It is certified that error appears in the above-identified patent and that said Letters Patent is hereby corrected as shown below:

On the Title Page,
Item (30) Foreign Application Priority Data should read:
    Dec. 2, 2005    (EP) ................................05405682

Signed and Sealed this

Fifteenth Day of July, 2008

JON W. DUDAS
*Director of the United States Patent and Trademark Office*